United States Patent [19]

Tower et al.

[11] Patent Number: 5,078,957

[45] Date of Patent: Jan. 7, 1992

[54] INCORE INSTRUMENTATION SYSTEM FOR A PRESSURIZED WATER REACTOR

[75] Inventors: Stephen N. Tower, Washington Township, Westmoreland County; Robert E. Meuschke, Murrysville Boro, Allegheny County, both of Pa.

[73] Assignee: Westinghouse Electric Corp., Pittsburgh, Pa.

[21] Appl. No.: 618,126

[22] Filed: Nov. 26, 1990

[51] Int. Cl.$^5$ ............................................. G21C 17/00
[52] U.S. Cl. ..................................... 376/254; 376/245
[58] Field of Search .......................... 376/245, 254, 255

[56] References Cited

U.S. PATENT DOCUMENTS

| | | | |
|---|---|---|---|
| 3,827,935 | 8/1974 | Grüner et al. | 176/19 R |
| 3,853,702 | 12/1974 | Bevilacqua et al. | 176/87 |
| 3,899,390 | 8/1975 | Klein et al. | 176/19 R |
| 3,976,541 | 8/1976 | Stiteler et al. | 176/37 |
| 4,438,649 | 3/1984 | Gilman | 73/432 |
| 4,765,947 | 8/1988 | Babin et al. | 376/347 |
| 4,983,351 | 1/1991 | Tower et al. | 376/254 |

FOREIGN PATENT DOCUMENTS 2065512 10/1970 France .
88/11224 8/1988 France .

OTHER PUBLICATIONS

*Nuclear Power Plant Systems and Equipment*, Ch. 2, pp. 6–23, K. C. Lish, ISBNO-8311-1078-3.

*Primary Examiner*—Brooks H. Hunt
*Assistant Examiner*—Chrisman D. Carroll
*Attorney, Agent, or Firm*—Z. L. Dermer

[57] ABSTRACT

A preferred embodiment of the present invention provides an incore instrumentation system for detecting conditions, e.g., neutron flux density, within the core of a pressurized water nuclear reactor (PWR). The instrumentation system includes a plurality of long straight thimbles (52), containing fixed incore detectors, which are inserted through the top closure head (18) of the PWR. The invention meets today's principal utility, EPRI, DOE and NRC requirements and preferences, including no bottom RV head penetrations and the use of fixed incore instrumentation. In addition, an instrumentation system according to the invention is mechanically simple with a straight core insertion/removal path that does not conflict with or add significant complexity to the reactor internals.

18 Claims, 7 Drawing Sheets

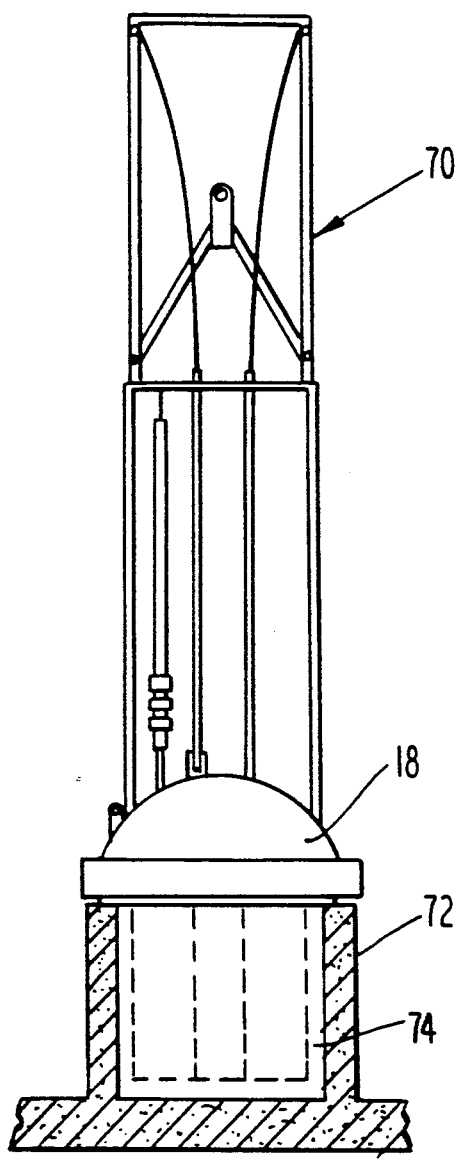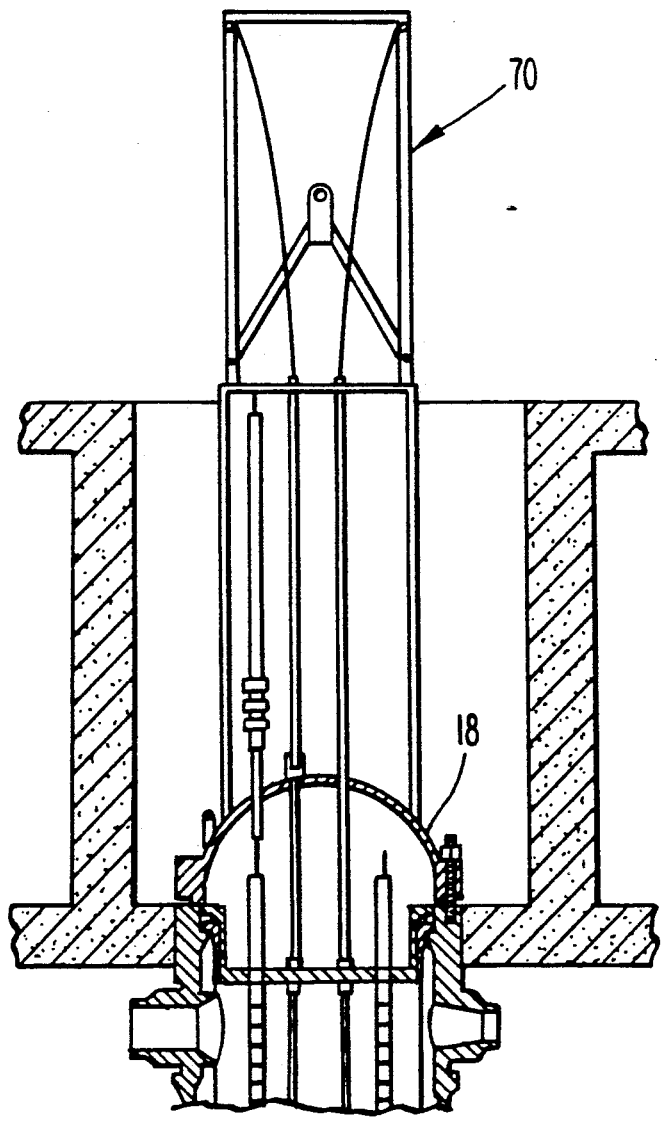
Fig. 6(A)
Fig. 6(B)

INCORE INSTRUMENTATION SYSTEM FOR A PRESSURIZED WATER REACTOR

BACKGROUND OF THE INVENTION

The present invention relates to pressurized water nuclear reactors (PWRs). More particularly, the present invention relates to an incore instrumentation system for a pressurized water nuclear reactor.

Before discussing the invention per se, some background information relating to PWRs is presented. For further background, see "Nuclear Power Plant Systems and Equipment," by K. C. Lish, ISBN 0-8311-1078-3.

A pressurized water nuclear power station contains a closed loop of pressurized water which removes heat energy from the core of the PWR, and transfers the energy to a second system for generating steam. The steam, in turn, drives a turbine generator which produces electrical power.

The reactor system consists of a pressure vessel containing the nuclear fuel which generates the heat energy, a steam generator in which the heat energy is used to generate steam, a circulating pump which circulates the coolant, and a pressurizer that maintains and controls system pressure. A nuclear island of a PWR power station consists of three or four buildings, depending on the individual design. The three buildings that must always be present are the reactor containment building, the fuel handling building, and the auxiliary building. The fourth, optional, building, is the control building. The space provided in this last building is always required, but some designs include it as an additional wing to another building.

The reactor building is typically a spherical structure or cylindrical structure with a hemispherical or elliptical top head. The bottom head may be either of the two shapes just mentioned or a flat head, depending on the structural design. The reactor building contains all of the primary system equipment. It also has a polar crane which is used during normal refueling, in-service inspection, and for general maintenance.

The fuel handling building contains the spent fuel storage pool, a bridge crane over the pool for handling the fuel shipping cask, and all of the spent fuel cooling system equipment. This building is connected to the reactor building by a fuel transfer tube.

The control building, or wing, contains the central control room with its console and control panels, as well as the relay room with its relays and controllers. The entire plant is controlled from this spot.

FIG. 1 depicts a typical PWR assembly 10. The reactor assembly consists of a pressure vessel 12 with a thermal shield, core support plates 32, 54, control rods 22, etc. Coolant enters the vessel and flows down the annulus between the core barrel and the vessel wall; in the process it cools the thermal shield. The coolant turns, flows up through the fuel elements and out of the vessel to the steam generator. Control rods enter through the top head 18 and the control rod drive mechanisms are mounted on the top head. The drive mechanisms and top head are handled as one package during plant refueling. This package is often referred to as an "integrated head package," or "IHP."

In FIG. 1, the neutron detectors 36 entering the bottom head are combined with thermocouples which measure coolant temperature at the outlet of an individual fuel assembly 30. Together they are known as "incore instrumentation." They are information instrumentation only and provide data with which to calculate the power produced in the different regions of the core.

FIG. 2 depicts a known arrangement of an instrumentation system for a PWR. In this embodiment, the instrumentation system includes a guide tube cluster assembly 46 and a number of guide tubes 48 penetrating an upper support plate 42a. The primary difference between this arrangement and the arrangement shown in FIG. 1 is that this arrangement employs flexible guide tubes 48 and cluster assembly 46, in contrast to the rigid guide tubes shown in FIG. 1.

Returning to FIG. 1, during the refueling operation all internals inside the core barrel above the upper core plate 54 are removed. This permits direct access to the top of the fuel assemblies 30 for manipulation.

The fuel rods are assembled into grids in, e.g., typically a 17×17-square array. One assemblage of fuel rods into grids is called a "fuel element assembly," and is the smallest fuel unit handled in a power station. A core is built up by grouping fuel assemblies 30 side-by-side in an essentially cylindrical shape. The higher the power level desired, the more fuel element assemblies are used. Core diameters typically run from 9 ft. to 13 ft., depending on the power level. Core height is typically 10 to 14 ft. for large PWRs.

The control rods are cylindrical rods located inside control-rod guide channels 20 in various locations in a fuel element assembly, in place of fuel rods. The different manufacturers do not use the same neutron absorber nor do they have the same number of rods.

The control rod drives 14 are mechanical, and are either infinitely positionable or move in a series of discrete steps. All rod drives, regardless of manufacturer, incorporate a magnetic latch device which is de-energized for "scram" (i.e., emergency shutdown). The control rods withdraw upward and drop into the core by gravity during scram. The control rod drives enter the reactor pressure vessel through the top head 18.

When the reactor is operating, measurements of neutron flux must be carried out inside the reactor core, in various places distributed along its cross-section and along its height. These measurements are carried out by the incore nuclear instrumentation, which comprises the subject matter of the present invention.

An instrumentation device for the core of a nuclear reactor, in which the measurement conduits pass through the closure head is described in French Patent 2,065,512. The instrumentation device described therein comprises guide tubes capable of receiving either neutron detectors in a fixed position or detectors which can move inside the respective tubes. The guide tubes pass through the vessel closure head inside columns and are then distributed along the cross-section of the core by beam-shaped support arms arranged under the vessel closure head, which enable each of the director tubes to be directed towards a guide tube of a particular core fuel assembly.

With this prior art device, in order to recharge the core, after the vessel has been depressurized, the devices permitting the leakproof passage of the instrumentation columns are disassembled and then the vessel closure head is disassembled to permit access to the support arms and the director tubes.

There are several disadvantages with this prior art device, however. Firstly, the withdrawal of the support arms, each carrying a plurality of guide tubes independently of one another, must be performed with the aid of a special tool, so as to preserve the shape and the distribution of these conduits. This requires numerous handling operations requiring special tools. The time involved can therefore be very long, which increases the length of reactor downtime. This can be a major disadvantage. Secondly, in order to avoid having a large number of support arms of complex shape, the number of assemblies into which a neutron flux detector can be introduced is limited, at the expense of the accuracy of the flux pattern measurements in the core.

In the above case, as in all cases, the measurement conduits comprise an end part which is introduced into the core and a second, opposed end part which enters a measurement room arranged in the vicinity of the reactor core. The measurement conduits are mounted slideably in the instrumentation tubes and may be withdrawn or installed merely by pulling or pushing on their ends, from within the measurement room. The measurement conduits must, in fact, be withdrawn from the fuel assemblies of the core when the reactor core is being recharged. Moreover, the measurement conduits must enter the reactor vessel through leakproof passages through which guide tubes of great length are connected, linking the reactor vessel with the measurement room.

In a second embodiment which is known and widely employed, the passages for the measurement conduits consist of fittings provided on the convex bottom of the reactor vessel. The instrumentation guide tubes connected to these fittings have a path in the shape of an arc of a circle of large radius of curvature, joining the bottom of the vessel to the measurement room. The provision of fittings in the convex bottom of the vessel complicates the manufacture of this component and leads to difficulties in the observance of safety standards. Moreover, the structure of the reactor building must be designed to permit the passage of instrumentation guide tubes of great length along a trajectory which is a circular arc. As a result of this, the design and the construction of the reactor building are made more difficult and costly.

Furthermore, access of the fittings passing through the bottom of the vessel is very difficult, and this complicates the operations of monitoring these fittings in order to ensure that the reactor operates in complete safety. In addition, the instrumentation guide tubes connected to the bottom of the vessel are always filled with the core coolant water, with the result that this water can enter the measurement room in the event of a fault in the sealing of the guide tube.

An instrumentation device has also been proposed and used, in which the measurement conduits pass through the vessel closure head. See, e.g., French Patent 2,065,512. This avoids the disadvantages associated with the need to provide fittings in the bottom of the vessel and a complex reactor building structure to permit the passage of the instrumentation guide tubes towards the measurement room. However, in a layout of this kind, a part of the instrumentation device called "upper internal equipment" is carried directly by the closure head, which complicates the operation of dismantling the closure head, as well as the instrumentation handling and storage operations associated with the closure head during reactor stoppages.

During a reactor stoppage for recharging and maintenance, the upper internal equipment is withdrawn and arranged on the storage stand in the reactor pool. In the case of a core instrumentation device comprising guide tubes or measurement conduits passing through the closure head, the known arrangements do not make it possible to perform the handling of the upper internal equipment in a simple and quick manner. The advantages obtained in respect of the design and construction of the reactor, when the core instrumentation passes through the vessel closure head, are therefore accompanied by very considerable disadvantages insofar as the use and maintenance of the reactor are concerned. For this reason, most of the nuclear reactors which are now in service incorporate instrumentation tubes which pass through the bottom of the vessel.

In addition, as a result of the Three Mile Island incident in 1979, there has been an emergence of DOE, EPRI and NRC preferences for incore instrumentation systems which do not penetrate the reactor vessel (RV) below the core, and which employ fixed incore detectors (FIDs). These factors are believed to improve plant safety and operational control.

In accordance with the above discussion, an object of the present invention is to provide a simplified incore instrumentation system (SICIS) for a PWR that eliminates bottom reactor vessel penetrations and also employs FIDs for measuring core power distribution. A further object of the invention is to provide a SICIS that is easily and safely installed in and withdrawn from the PWR. These and other objectives are achieved by the present invention.

SUMMARY OF THE INVENTION

According to one aspect of the present invention, a simplified incore instrumentation system (SICIS) for use in a pressurized water nuclear reactor (PWR) comprises a plurality of fixed incore detector (FID) thimbles, each of which is inserted through the closure head and into the core of the PWR. Each thimble contains at least one, but usually several, detectors (e.g., a neutron or gamma detector) for detecting a condition (local power level) of the core. The thimble also contains a thermocouple for measuring core exit temperatures. In addition, an upper support plate is provided. The upper support plate is arranged between the closure head and the upper core plate, and supported by at least one support column. The support columns each include an axial void adapted to allow insertion of a thimble axially through the center of the support column. During operation of the PWR, the thimbles extend from the core, through the upper core plate, through one of the respective support columns, through an aperture in the upper support plate and through an aperture in the closure head to a seal fitting above the closure head. The detector signals are thereby made accessible outside of the PWR; e.g., to further equipment for monitoring the state of the core.

According to a second aspect of the invention, a nuclear-powered turbine generating station is provided. The generating station includes the SICIS described above, a turbine generator for generating electrical power, and a PWR coupled to the SICIS and the turbine generator.

BRIEF DESCRIPTION OF THE DRAWINGS

FIG. 6(A)-(C) depict alternative embodiments of a system for removing and storing the SICIS in accordance with the present invention.

DETAILED DESCRIPTION OF THE PREFERRED EMBODIMENTS

The preferred embodiments of the invention will now be described with reference to FIGS. 3-7, wherein like numerals designate like elements.

Figure 3:
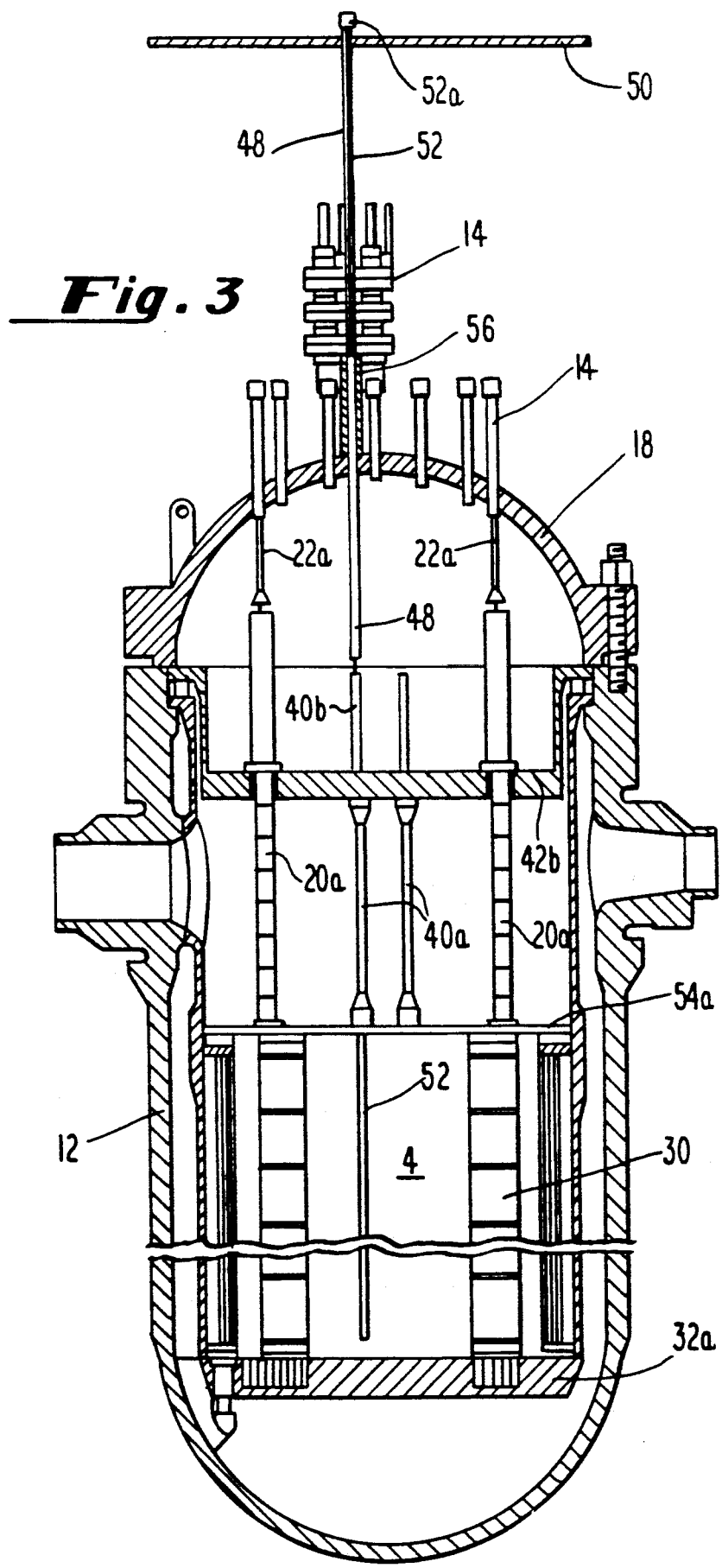
FIG. 3 depicts a PWR and simplified incore instrumentation system (SICIS) in accordance with the present invention.

Referring now to FIG. 3, a PWR incorporating a SICIS in accordance with the present invention comprises the reactor vessel (RV) 12 covered by a removable closure head assembly 18. The reactor core 4 is composed of a plurality of fuel assemblies 30. The reactor core 4 rests on a lower core plate 32a fastened to the reactor vessel 12.

Above the core 4 is an upper core plate 54a, connected by vertical support columns 40a to an upper support plate 42b of substantial thickness (typically about 10 inches thick (25.4 cm.)).

In addition to the upper core plate 54a and support columns 40a, the SICIS includes control rod guide tubes 20a for control rods and control rod drive shafts 22a which pass through the reactor vessel's closure head 18.

In a preferred embodiment, twenty-five or more detector thimbles 52 are inserted vertically into the RV 12 and core 4 through the head assembly 18, and through the upper internals support columns 40a. In addition, each thimble 52 contains six or more axially distributed FIDs and a thermocouple for measuring fuel assembly collant exit temperatures (not shown). Primary boundary thimble seals 52a and detector wiring (also not shown) are located on the top of missile shield plate 50. This arrangement requires that pressure boundary guide tubes 48 (approximately 1.0" OD×0.5" ID (2.54 cm×1.27 cm)) be employed extending approximately 22 feet (6.71 m) from a head 18 penetration up through the missile shield 50. Adequate space is provided between the CRDM magnets 14 (see FIG. 5) for the guide tubes (3.4 in. diameter (8.6 cm)) to pass comfortably. The detector thimbles 52 are approximately 0.4 in. (1.0 cm) in diameter, about 51 ft. (15.5 m) long, and equipped with fittings or seals 52a to seal the guide tubes.

Figure 1:
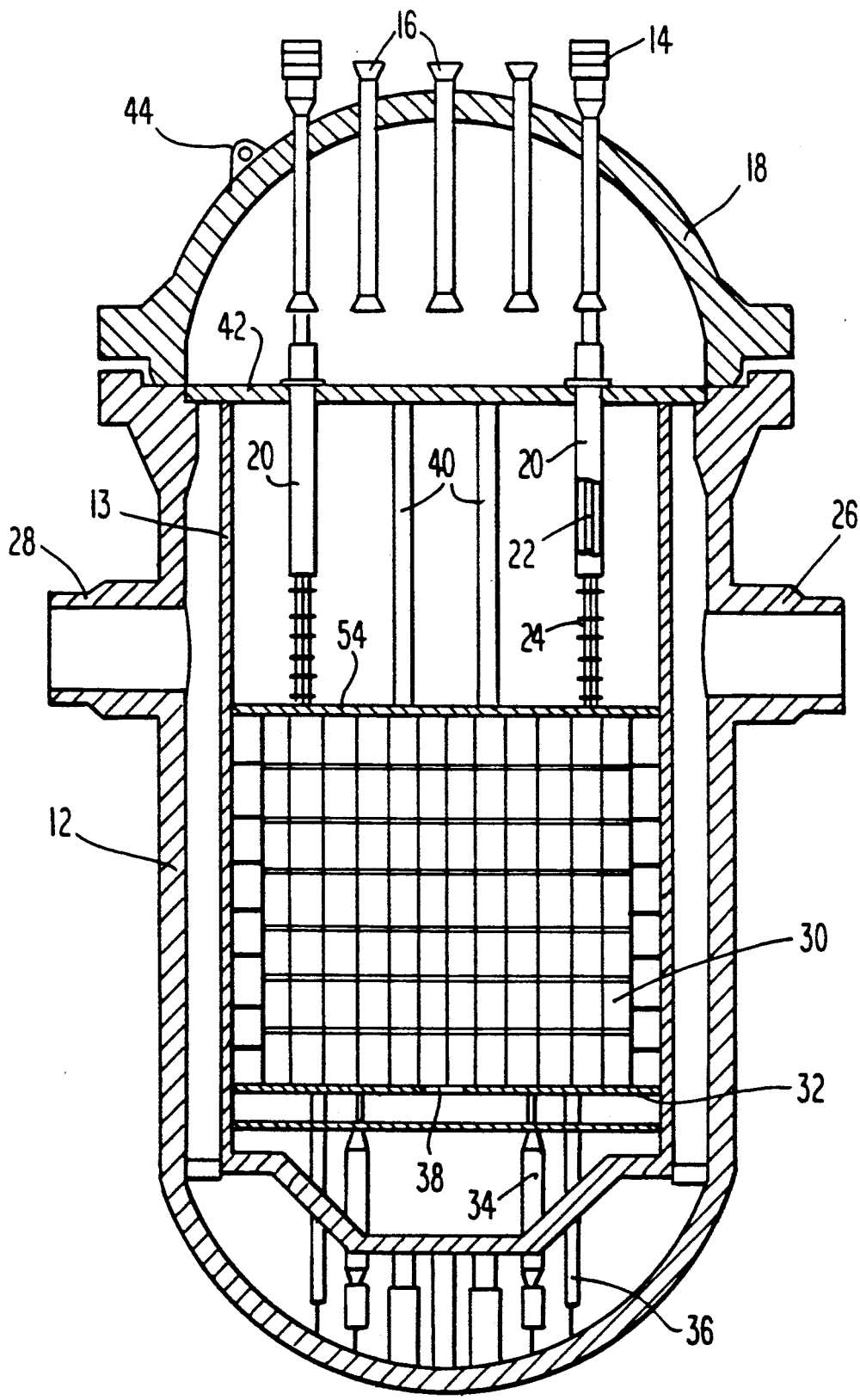
FIG. 1 is a sectional view of a known pressurized water reactor (PWR).
Figures 2, 4:
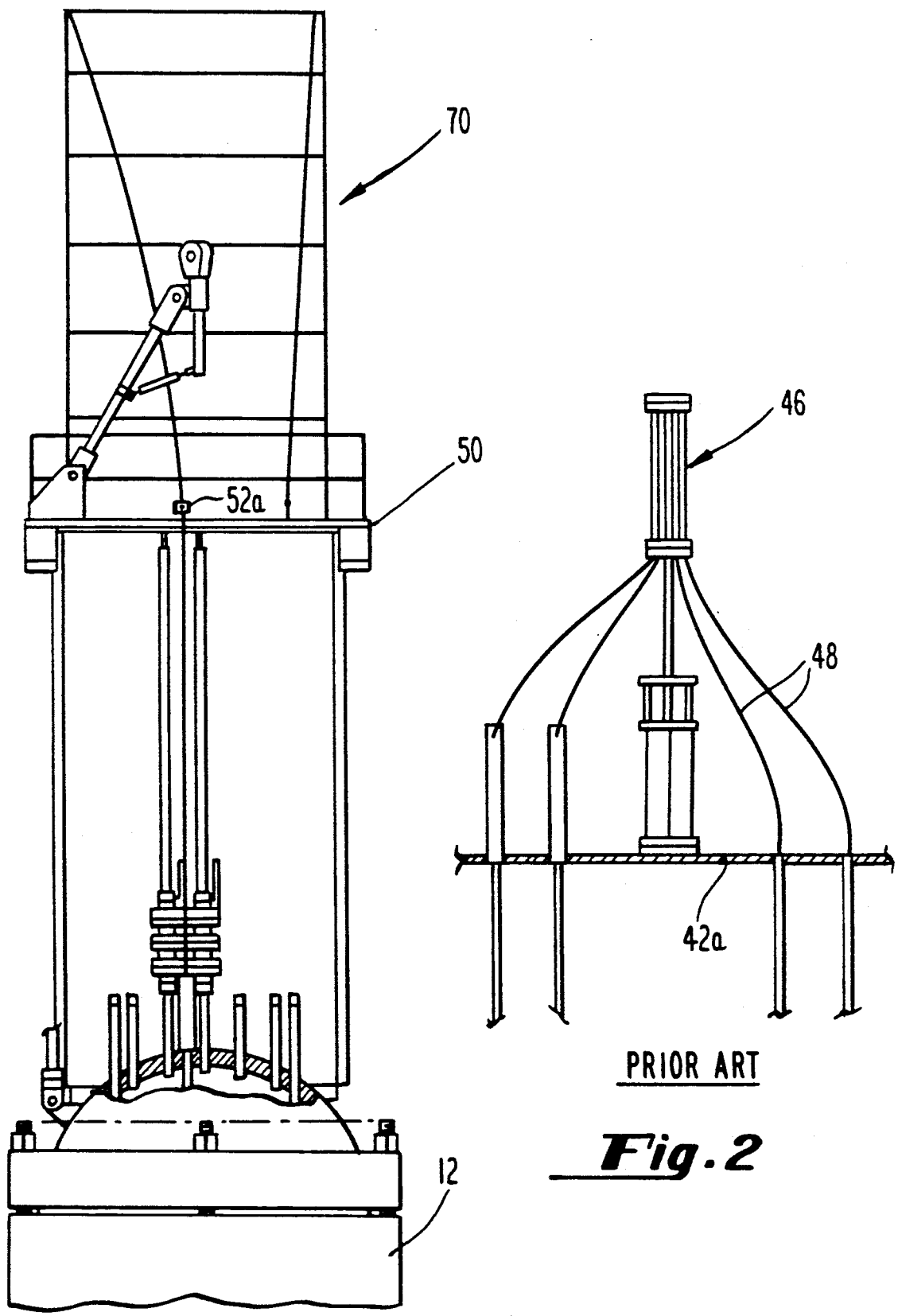
FIG. 2 depicts a known configuration for an instrumentation system of a PWR.
FIG. 4 is a side view of the PWR of FIG. 3 in conjunction with an apparatus for installing/ deinstalling the SICIS in accordance with the invention.

Referring now to FIG. 4, therein is shown a side view of an apparatus according to the invention for installing and removing the SICIS from the reactor vessel 12. Refueling operations require that the thimble/guide tube seals 52a be disconnected and that the thimbles 52 be retracted upwardly approximately 20 ft. (6.1 m). The upper non-radioactive portion of each thimble is secured in a raised position in a special rack 70 mounted above the IHP missile shield 50. The thimble storage rack 70 is designed with an internal tripod lifting rig so that a polar crane hook can be attached to the IHP without interfering with the raised thimbles 52. During IHP removal operations, the radioactive "hot" tips of the retracted thimbles 52 are stored under and within shielded positions of the IHP to minimize occupational radiation exposure (ORE). For removal and replacement of the thimbles 52, the "hot" portions are lowered into the refueling pool 74 where they can be cut off and transferred to the spent fuel pit (see FIGS. 6(A), 6(C)).

Figure 5A:
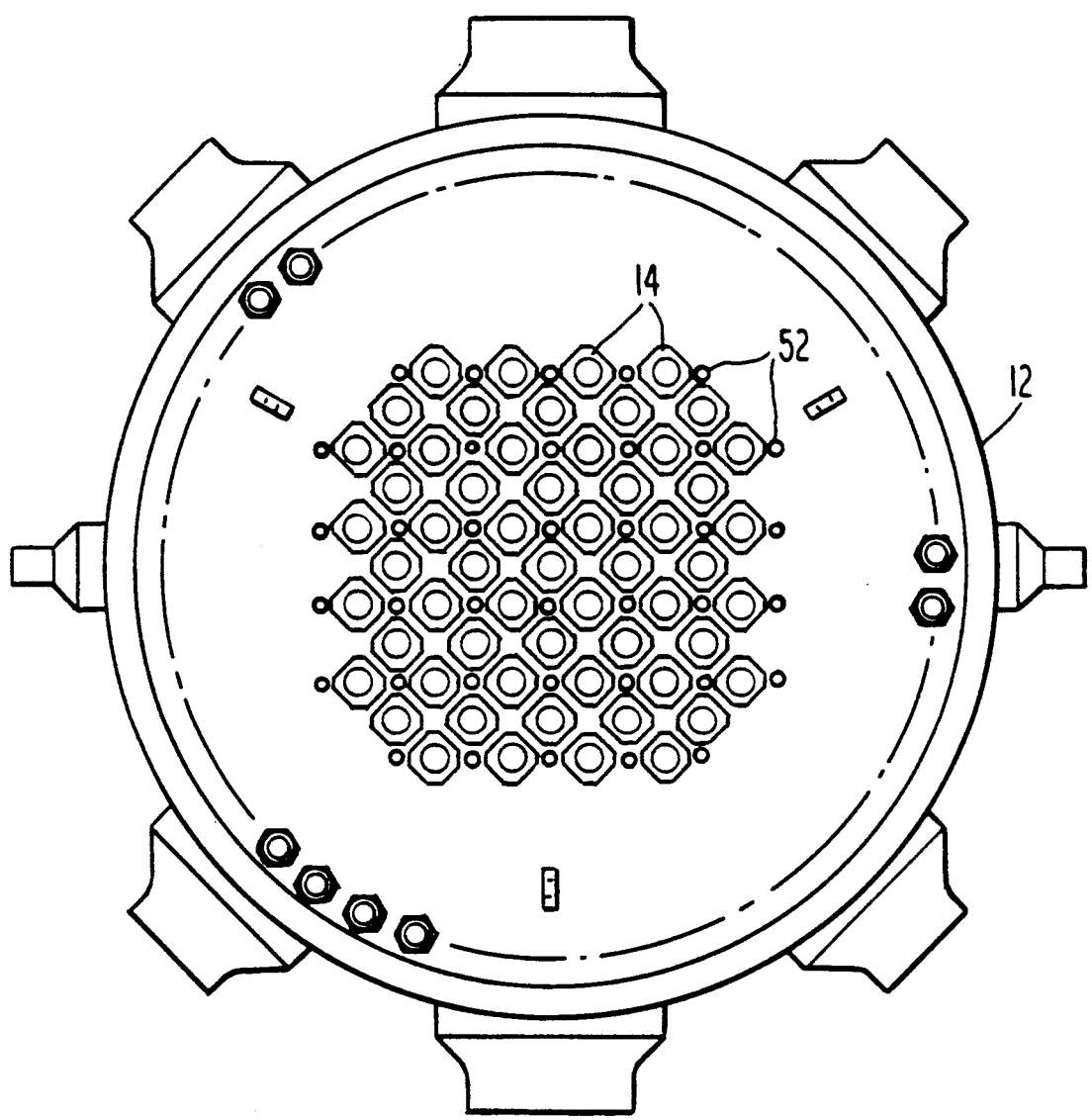
FIG. 5(A) is a simplified reactor vessel head layout in accordance with the present invention.
Figure 5B:
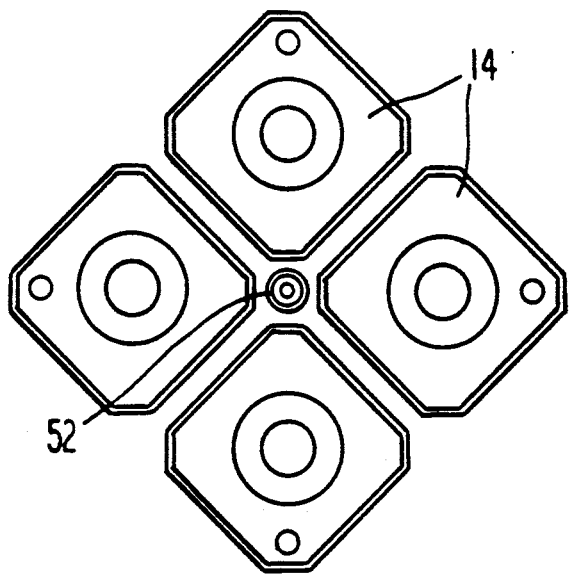
FIG. 5(B) depicts a enlarged portion of the layout depicted in FIG. 5(A).

FIGS. 5(A) and 5(B) show the layout of the FID thimbles 52 and CRDM magnets 14 within the RV head. As shown, sixteen to thirty eight thimbles 52 are approximately evenly distributed throughout the core. Each thimble 52 is a straight piece of tubing containing 6 or 8 FIDs (neutron detectors or gamma detectors) axially spaced over the active core 4 height. The radial locations of the thimbles 52 are constrained to positions where there are no CRDMs 14 and where internal equipment support columns 40a are provided. The 6 FIDs contained in each thimble are located in the bottom 135 inches (343.8 cm) of the thimble which terminates at the level of the second fuel assembly rod support grid 54a (approximately 21 inches (53.3 cm) above the lower core support plate). The FIDs (rhodium, platinum or gamma thermometers) are disposed within the fuel assemblies instrument tube during plant operation. During refueling operations the detector thimble 52 is manually withdrawn vertically upward into the space immediately beneath the RV head and stored in that raised position during lifting and transfer of the IHP to its storage position in containment. The thimble is raised approximately 20 feet (6.1 meters) with the unirradiated upper end of the thimble exposed above the IHP missile shield and the irradiated 135 inch (3.4 meter) long hot tip retained beneath the RV head 14. The 6 to 7 inch (15.2 cm-17.8 cm) thick steel RV head provides shielding for personnel during refueling operations. Because of the limited height available under the RV head, 40 or 50 inches of "hot" thimble will protrude above the head 14. Up to three inches of steel or lead or depleted uranium shielding 56 is provided around the housings of these exposed portions.

Figure 6C:
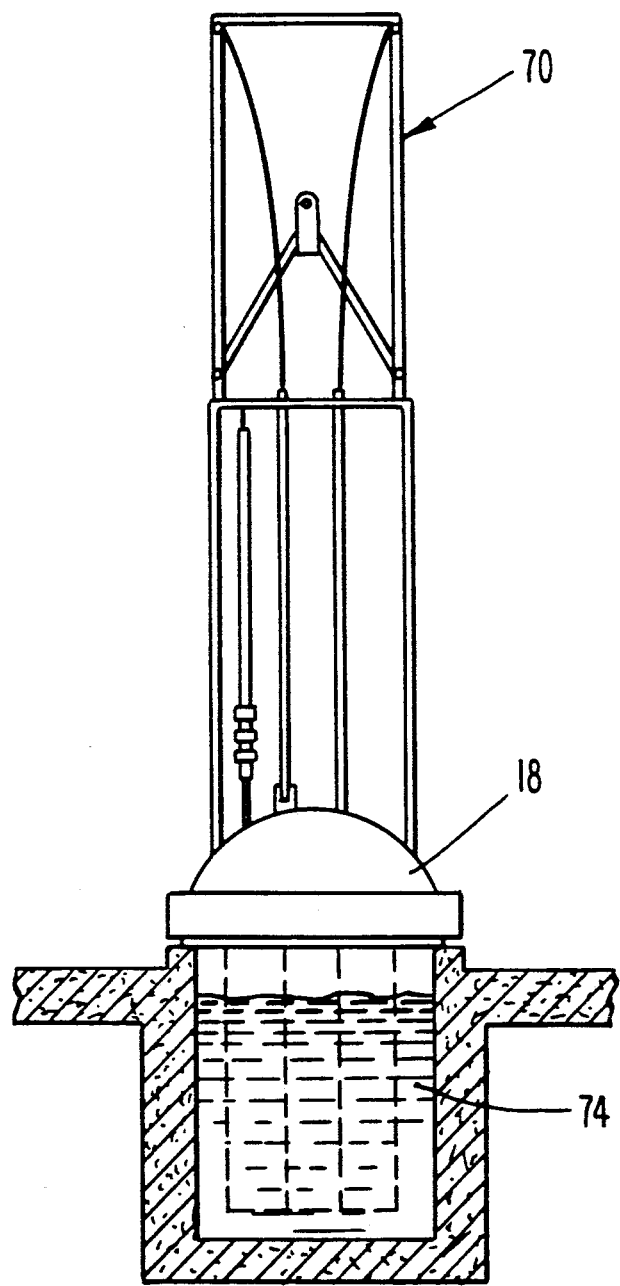

Refueling and maintenance of the PWR with the SICIS requires certain new procedures and apparatuses, and eliminates others. Specifically, as shown in FIGS. 6(A)-(C), the special detector thimble handling and storage frame 70 is mounted on top of the IHP 18. This frame incorporates a lifting rig and a pulley and rope system for raising or lowering each detector thimble 52. When the thimbles are in the raised position they are tied off and secured during head lift operations. Concerns about airborne radioactive contamination are answered by providing plastic sleeves or bagging for each raised thimble.

Thimble 52 refueling and handling procedures are as follows:

1. Cannon type multiple electrical connectors for the FIDs in each thimble are disconnected and jumper cables on the IHP removed.
2. A mechanical lifting fixture (which also protects the thimble electrical connector) is attached to the thimble and to the rope lifting halyard.
3. The thimble seal 52a (e.g., swagelok) is broken, the thimble is raised approximately 20 feet (6.1 meters) by the halyard and then secured to the lifting frame.
4. Cleaning of the thimble is performed as necessary as the thimble is pulled out of its pressure housing.

5. The crane hook is lowered and attached to the IHP lifting rig. The IHP and thimble frame are then transported together to the IHP storage stand.

Two alternative storage arrangements in containment are shown in FIGS. 6(A)–6(C). Provision is required in the containment IHP storage position for lowering the "hot" 135 inch (3.4 meter) long thimble tips into a shield pit 72 or pool 74 so that defective "hot" thimbles can be inspected or replaced and so that radiation exposure to personnel working on the IHP can be reduced to acceptable levels. The replacement of a detector thimble is similar to the procedure now used in Westinghouse Electric Corp. MID/ICIS plants. Hot portions of the thimble 52 are chopped off in the shield pit 72 or pool 74 and placed in a handling basket or storage drums (not shown). Unirradiated thimble parts are withdrawn through the top head. New replacement thimbles are pushed down through the housing tube into the head 18.

The transport of the RV head containing 16 to 38 thimbles which have been irradiated in the core for 1½ years requires the use of special procedures and possibly special shielding, especially when the head is lifted above the floor and appreciable gamma shine and scatter are present in containment. Removing all personnel from containment or locating them behind shadow shielding is one means of controlling ORE. The addition of a removable bottom steel shield plate 4 to 6 inches (7.6–10.2 cm) thick to the underside of the head 18 may also reduce ORE during transport to acceptable levels.

Figure 7:
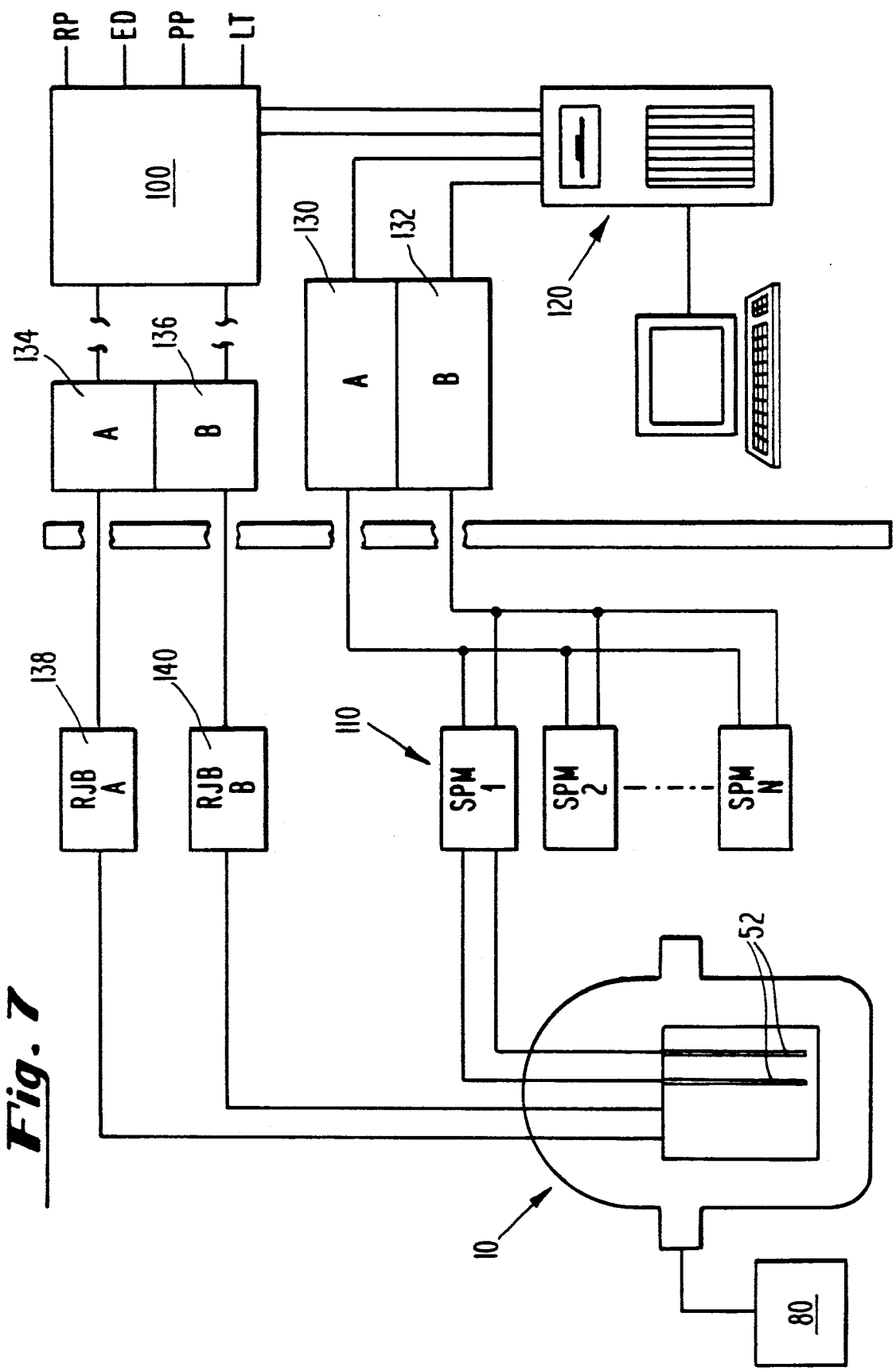
FIG. 7 is an overall block diagram of a preferred PWR ICIS according to the present invention.

FIG. 7 depicts a preferred PWR/SICIS electronics configuration, in block diagram form. Prior systems required extensive FID or MID data for determining the core power distribution. These prior systems combined neutron flux measurements with predictions made prior to the start of a fuel cycle to determine the measured power distribution.

In the preferred embodiment of the present invention, advanced analytical methods and computational hardware are employed to provide the plant with an analytical tool previously available only to the core designer. The electronic system utilizes measurement data from the FIDs and other plant sensors to confirm the predicted core power distribution and adjust it as necessary. This different approach makes it possible to reduce the number of neutron sensors in the core.

Referring to FIG. 7, the thermocouple signals are processed through RJB A 138 and RJB B 140 and the Indadequate Core Cooling Monitor (ICCM) 134, 136 and transmitted to the plant computer 100 and computational workstation 120. FID thimble 52 data is transferred to data receivers 130, 132 via the Sensor Highway 110, shown as signal processing modules SPM 1, SPM 2, ... SPM N. This configuration assumes that the FIDs will be only providing suveillance information. Other information which is provided to the computer 100 includes rod positions (RP), Excore Detector signals (ED), Pressurizer Pressure (PP) and Loop temperatures (LT). Note also that the PWR 10 is coupled to a turbine generator 80 which converts the steam's thermal energy into electrical power.

The PWR Simplified Incore Instrumentation System described above has advantages over previous systems that can be summarized as follows:

1. The SICIS meets today's principal utility, EPRI, DOE and NRC requirements and preferences:
    a) No bottom RV head penetrations are needed;
    b) The SICIS employs fixed incore instrumentation.

2. The SICIS is mechanically extremely simple with a straight core insertion/removal path that does not conflict with or add significant complexity to the reactor internals. The inclusion of core exit thermocouples in each FID thimble also simplifies RV internals and RV head penetrations.

3. Mechanically, the SICIS requires only relatively simple modification to the fuel assembly top nozzle and the internal equipment support columns, the addition of tubular thimble pressure boundary housings to the RV head and the addition of a detector thimble support frame above the IHP.

4. The SICIS employs only FIDs and, as a consequence, eliminates the teleflex drives, transfer devices and controls needed for movable incore detectors (MIDs). Less space is required and reliability is enhanced. It also eliminates the 80–100 ft (24.4 m–30.4 m) long guard tubes and lower cavity space associated with the MID bottom mounted ICIS.

Although preferred embodiments of the invention have been described in detail, many modifications and variations (e.g., in the physical dimensions) of the embodiments described will be apparent those to skilled in the art. Accordingly, the scope of the invention is intended to be limited only by the following claims.

We claim:

1. In a pressurized water nuclear reactor (PWR) having a reactor vessel (12), a closure head (18) covering one end of the reactor vessel, a core (4) within the reactor vessel for supporting a plurality of fuel assemblies (30), the fuel assemblies being supported between a lower core plate (32a) and an upper core plate (54a), and a plurality of control rods each of which is coupled to an associated control rod drive mechanism (CRDM) (14), an incore instrumentation system (ICIS) for detecting a condition within the core, the ICIS comprising:
   (a) a fixed incore detector (FID) thimble (52) slidably insertable through said closure head (18) and into said core (4), said thimble containing at least one detector for detecting a condition of the core and providing a signal indicative thereof;
   (b) an upper support plate (42b) having an aperture and disposed between said closure head (18) and said upper core plate (54a);
   (c) at least one support column (40a) supporting said upper support plate and adapted to allow insertion of said thimble axially through the center of said support column; and
   (d) a guide tube (48), mounted between the aperture in said upper support plate and the aperture in said closure head, for guiding said thimble substantially straight through the closure head and to the support column;
   said thimble extending substantially straight from the core (4), through the upper core plate, through the support column (40a), through the aperture in the upper support plate (42b), through the guide tube (48) and through an aperture in the closure head (18).

2. An ICIS as recited in claim 1, wherein a corner of at least four adjacent ones of said CRDMs is adapted to permit insertion of said thimble through an intersticial passageway between said four CRDMs, and, thereafter through said closure head.

3. An ICIS as recited in claim 1, further comprising shield means (56), situated around said guide tube and above said closure head an outside of said reactor vessel, for blocking radiation from irradiated parts of said FID thimble when said thimble is withdrawn from the core.

4. An ICIS as recited in claim 1, further comprising an additional plurality of thimbles (52) each of which is slidably insertable substantially straight through said closure head (18) and into said core (4), each of said additional thimbles containing at least one detector.

5. A pressurized water nuclear reactor (PWR), comprising:
   (a) a reactor vessel (RV);
   (b) a closure head assembly detachably mounted on one end of said RV and having an aperture;
   (c) a core, within said RV, comprising a plurality of fuel assemblies;
   (d) a structure disposed above said core, defining upper internal equipment, comprising:
      (i) an upper core plate resting on said fuel assemblies,
      (ii) an upper support plate having an aperture, said support plate arranged above said upper core plate and coupled to said upper core plate via,
      (iv) a vertical support column having an axial passageway, and
      (iv) a guide tube mounted between the aperture in said upper support plate and the aperture in said closure head; and
   (e) incore instrumentation comprising: a fixed incore detector (FID) thimble slidably insertable through said closure head and extending substantially straight from the core, through the upper core plate, through the support column, through the aperture in the upper support plate, through the guide tube and through an aperture in the closure head, said thimble containing at least one detector for detecting a condition of the core and providing a signal indicative thereof, thereby making said signals provided by said detectors accessible outside of said PWR.

6. A PWR as recited in claim 5, further comprising at least four control rod drive mechanisms (CRDMs), wherein a corner of at least four adjacent ones of said CRDMs is adapted to permit insertion of said thimble through an intersticial passageway between said four CRDMs, and thereafter through said closure head.

7. A PWR as recited in claim 5, further comprising shield means (56), situated around said guide tube and above said closure head and outside of said reactor vessel, for blocking radiation from irradiated parts of said FID thimble when said thimble is withdrawn from the core.

8. A PWR as recited in claim 5, further comprising an additional plurality of thimbles (52) each of which is slidably insertable through said closure head (18) and substantially straight into said core (4), each of said additional thimbles containing at least one detector.

9. A PWR as recited in claim 5, wherein said detector is a neutron detector.

10. A PWR as recited in claim 5, wherein said detector is a gamma detector.

11. A nuclear-powered turbine generating station, comprising:
   (a) a turbine generator;
   (b) a pressurized water nuclear reactor (PWR) operatively coupled to said turbine generator, said PWR comprising:
      (i) a reactor vessel (RV);
      (ii) a closure head assembly detachably mounted on one end of said RV and having an aperture;
      (iii) a core, within said RV, comprising a plurality of fuel assemblies; and
      (iv) a structure disposed above said core, defining upper internal equipment, comprising:
         an upper core plate resting on said fuel assemblies,
         an upper support plate having an aperture, said support plate arranged above said upper core plate and coupled to said upper core plate via,
         a vertical support column having an axial passageway, and
         a guide tube mounted between the aperture in said upper support plate and the aperture in said closure head; and
   (c) incore instrumentation comprising: a fixed incore detector (FID) thimble slidably insertable through said closure head and into said core, each thimble containing at least one detector for detecting a condition of the core and providing a signal indicative thereof;
   wherein, during operation of said PWR, said thimble extends from the core, substantially straight through the upper core plate, through the support column, through the aperture in the upper support plate, through the guide tube and through an aperture in the closure head, thereby making said signals provided by said detectors accessible outside of said PWR.

12. A nuclear-powered turbine generating station as recited in claim 11, further comprising at least four control rod drive mechanisms (CRDMs), wherein a corner of at least four adjacent ones of said CRDMs is adapted to permit insertion of said thimble through an intersticial passageway between said four CRDMs, and thereafter through said closure head.

13. A nuclear-powered turbine generating station as recited in claim 11, further comprising shield means (56), situated around said guide tube and above said closure head and outside of said reactor vessel, for blocking radiation from irradiated parts of said FID thimble when said thimble is withdrawn from the core.

14. A nuclear-powered turbine generating station as recited in claim 11, further comprising an additional plurality of thimbles each of which is slidably insertable through said closure head and substantially straight into said core, each of said additional thimbles containing at least one detector.

15. A nuclear-powered turbine generating station as recited in claim 11, wherein said detector is a neutron detector.

16. A nuclear-powered turbine generating station as recited in claim 11, wherein said detector is a gamma detector.

17. An ICIS as recited in claim 1, wherein said detector is a neutron detector.

18. An ICIS as recited in claim 1, wherein said detector is a gamma detector.

* * * * *